Nov. 14, 1950   E. G. F. ROBERTSHAW   2,530,030
RACK ENGAGING LEVER CARRIED DETENT
Filed Nov. 13, 1947   3 Sheets-Sheet 2
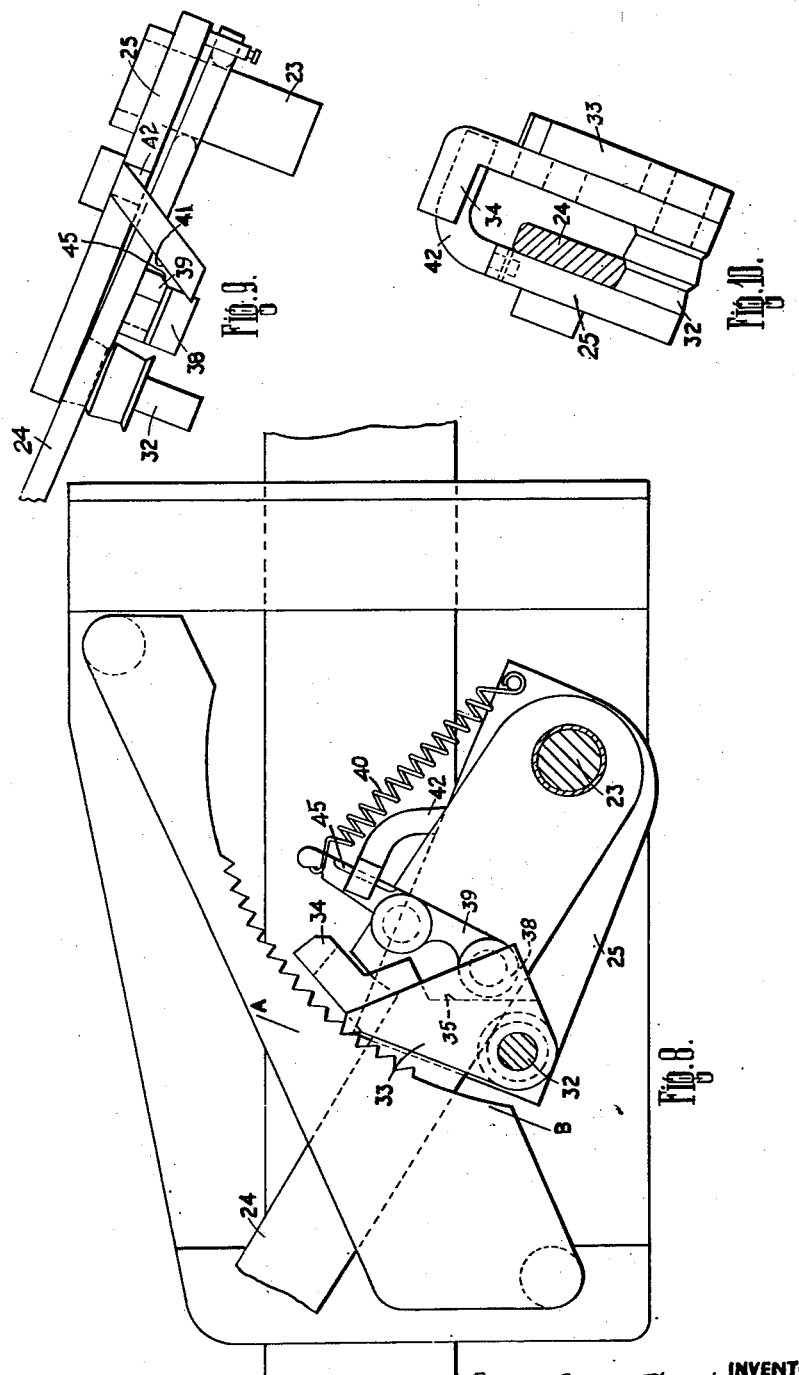
INVENTOR
Ernest George Francis Robertshaw.
BY
ATTORNEY

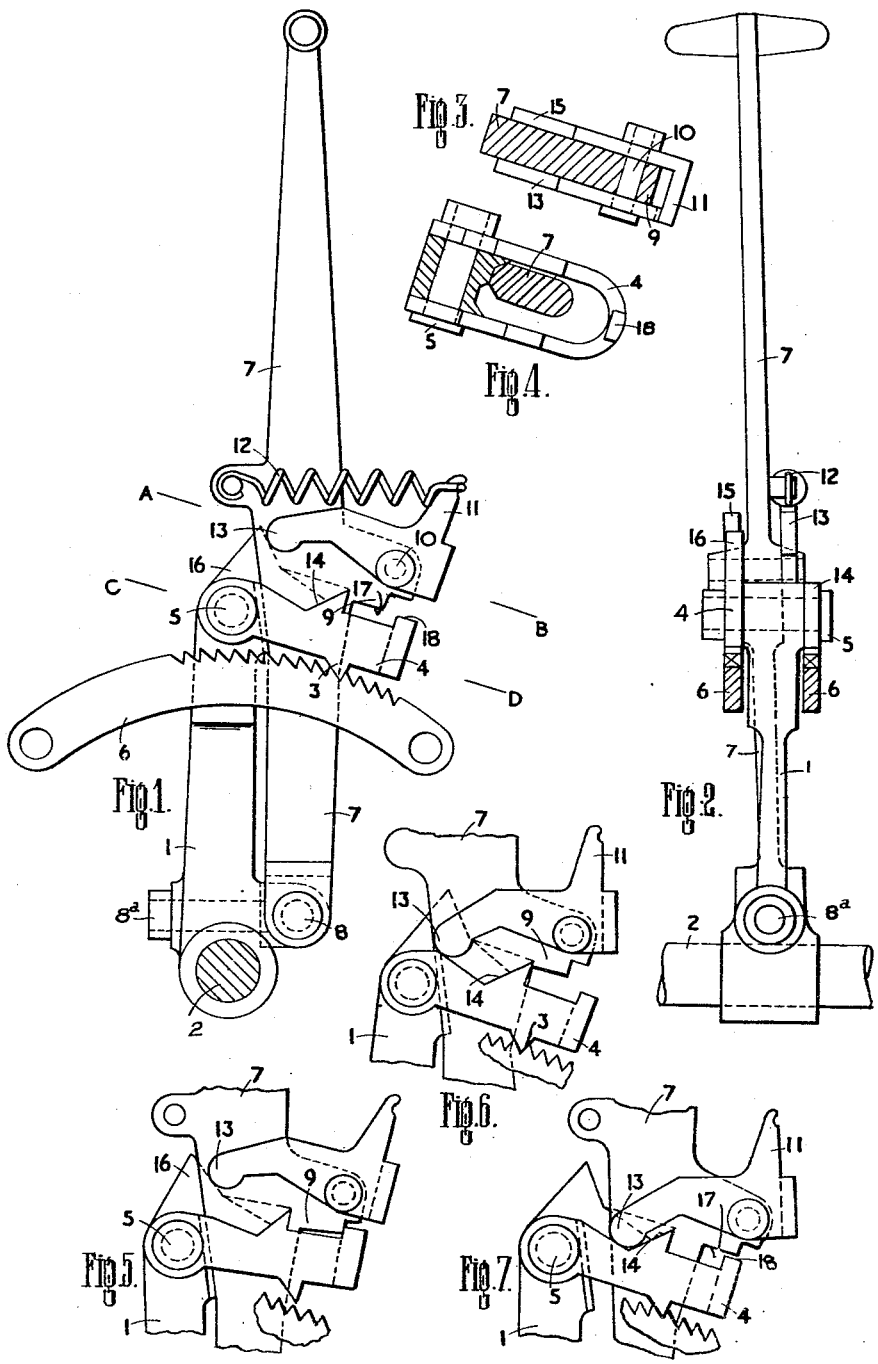

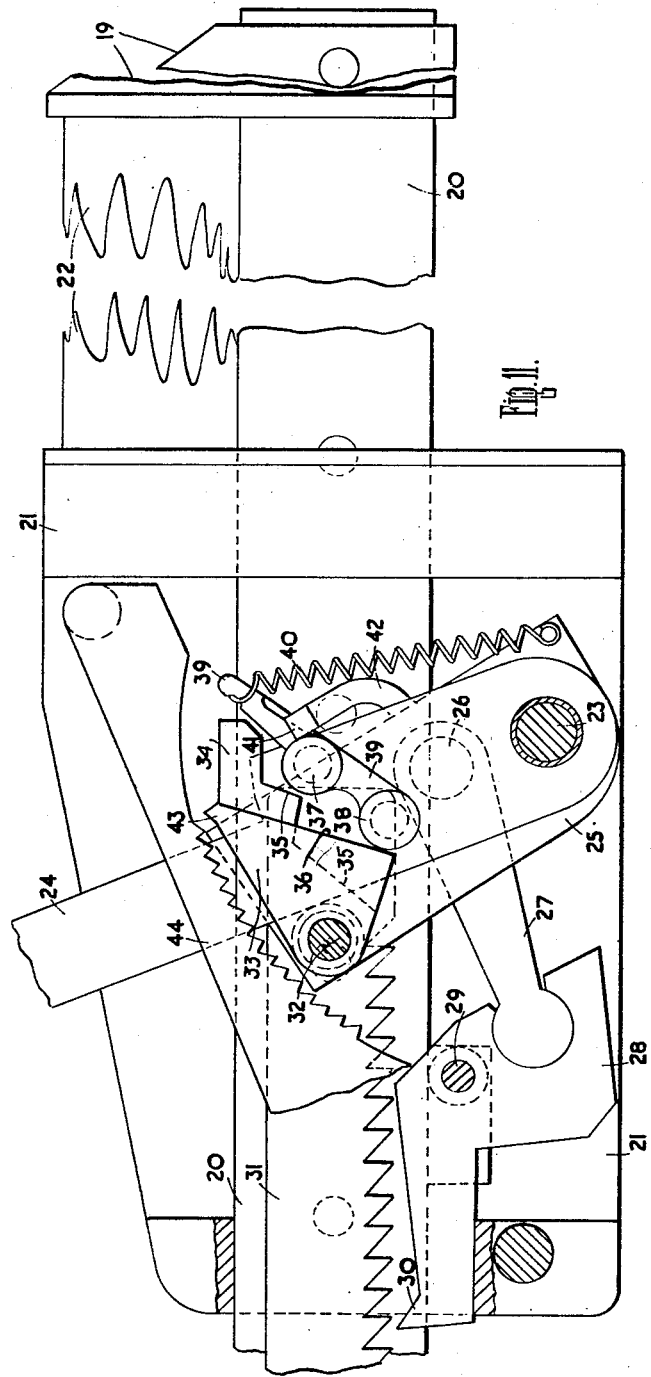

Patented Nov. 14, 1950

2,530,030

UNITED STATES PATENT OFFICE 2,530,030

RACK ENGAGING LEVER CARRIED DETENT

Ernest George Francis Robertshaw,
Baildon, England

Application November 13, 1947, Serial No. 785,649
In Great Britain November 18, 1946

8 Claims. (Cl. 74—536)

1

The present invention relates to an improved control lever for the operation of a machinery part such as the brake of an automobile vehicle, the chain or the like of a logging cramp as used in sawmills, the jaws of assembly cramps, crane or winch operating levers or the like operating levers of the type in which the operating lever has a limited degree of movement relatively to a control handle or lever, and is connected to a ratchet pawl which can be held locked either in the operating position or in the free position by movement of the control lever simultaneously serving for the displacement of the operating lever.

An object of the present invention is to provide a means for locking the lever by means of the ratchet pawl securing against accidental release, as by vibration.

According to the present invention an operating lever keyed to an operating shaft or connected by a link to a displaceable part, is connected to a locking ratchet pawl and is also connected, with a degree of lost motion, to a control lever or handle having a slight degree of lateral displacement by which a pivoted latch element is brought into range of either one of a pair of cam surfaces movable with a locking ratchet pawl adapted to engage with one or other of the teeth of a fixed ratchet rack, one cam surface serving to lift the pawl from its locking engagement with the ratchet rack, whilst the other serves to lock the pawl in its engaged position.

The invention is further described with reference to the accompanying drawings, in which:

Fig. 1 is a side elevation of one construction of a control lever,

Fig. 2 is a corresponding end view,

Fig. 3 is a part section on the line A—B of Fig. 1,

Fig. 4 is a part section on the line C—D of Fig. 1,

Figs. 5, 6 and 7 are views showing the parts in differing positions,

Fig. 8 is a side elevation of another form of construction,

Fig. 9 is a corresponding plan view with certain of the parts removed for clearness, Fig. 10 is a section on the line A—B of Fig. 8 with the rack removed, Fig. 11 is a view similar to Fig. 8 showing the parts in another position.

In the form of construction shown with reference to Figs. 1 to 7, an operating lever 1 is keyed to a shaft 2 which it is desired to displace about its axis, and hold locked in any desired angular position, this locking being effected by means of a pawl 3 on a ratchet lever 4 pivoted at 5 to the lever 1 and being adapted to engage with one or other of a number of teeth on an arcuate fixed rack bar 6. The ratchet lever 4 is formed as a yoke embracing a control handle 7, which is pivotally connected at 8 to lever 1, so that handle 7 can bear against the lever 1 to displace it in one direction, the bridge of the ratchet lever yoke 4 serving to limit the degree of rotation of handle 7 relative to the lever 1 in the opposite direction.

This handle 7 has also a certain degree of lateral movement within the ratchet lever yoke 4 in that at its inner end it is pivoted about a second pivot 8a disposed substantially at right angles to the axis of the shaft 2. This handle 7 has a lug 9 upon it on which is carried, by means of a pivot 10, a pawl operating cam member 11 under the action of a tension spring 12. This pawl operating cam member 11 is also formed as a yoke partly embracing the handle 7 and has on one side a nose 13 adapted to co-operate with a cam surface 14 formed on one side of the ratchet lever yoke 4, and on the other side of the handle 7 has a similar nose 15 adapted to co-operate with a cam surface 16 on the other side of the ratchet lever yoke 4.

The lug 9 is provided with a stop surface 17 adapted to co-operate with a stop lug 18 on the ratchet lever yoke 4.

In operation when it is desired to move the operating lever 1 in an anti-clockwise direction as seen in Figure 1, the control handle 7 is first displaced about the pivot 8a to the limit of its motion in an anti-clockwise direction as seen in Figure 2 in order that the nose 15 is engaging the cam surface 16, and then the handle 7 is displaced in an anti-clockwise direction as seen in Figure 1. Thus the co-operation of the nose 15 with the cam surface 16 causes the ratchet lever yoke 4 to be rotated about the pivot 5. Thus when the handle 7 is displaced to the left of Fig. 1, contacting with the outer end of lever 1 to turn the shaft 2 anticlockwise, the pawl 3 rides loosely and freely over the ratchet teeth on the rack bar 6 with the minimum of frictional resistance as it is not subject to the spring 12 forcing it into engagement therewith, the ratchet lever yoke 4 being lifted by reason of the nose 15 of the pawl operating cam member 11 engaging with the cam surface 16 on this ratchet lever yoke 4. When the operating lever 1 has reached the desired position, the parts are in the positions relative to one another shown in Figure 5; thereafter the handle 7 is displaced laterally from the position shown in Fig. 2 being rotated in a clockwise direction about the pivot 8a disengaging the nose 15 from the cam surface 16 with the position of the parts as shown in Fig. 5 to bring the nose 13 into range of the cam surface 14 on the other side of the ratchet lever yoke 4, as shown in Fig. 6, when the pawl 3 is free to fall into any of the notches of the rack bar 6 according to the position of desired adjustment of the lever 1. As the counterclockwise pressure on the handle 7 is released with the handle displaced counter-clockwise from the position shown in Fig. 1, then the nose 13 is free to drop into the depression in the cam surface 14 and enable the stop surface 17 on lug 9 to engage behind the stop lug 18 of the ratchet lever yoke 4, so holding the pawl 3 locked rigidly in position, as shown in Fig. 7. It will be seen that when the parts are in the position relative one to another as shown in Figure 7 the nose 15 is intermediate the handle 7 and the inside of the ratchet lever yoke 4 thus obviating undesirable lateral displacement of the handle 7.

When it is desired to release the operating lever 1, the control handle 7, whilst already displaced in a clockwise direction about pivot 8a as seen in Fig. 2, is displaced within the ratchet lever yoke 4 in a clockwise direction as seen in Figure 1 and then is displaced both in an anti-clockwise direction as seen in Fig. 2 and in an anti-clockwise direction as seen in Fig. 1. That is to say the control handle 7 is displaced in an anti-clockwise direction as seen in Fig. 4 so as to follow the inner surface of the curved portion of the ratchet lever yoke 4. During this movement firstly during the displacement of the handle 7 in a clockwise direction as seen in Fig. 1 the nose 13 is displaced up the cam surface 14 and the pawl operating cam member 11 thereby rotated about the pivot 10, secondly during the displacement of the handle 7 in an anti-clockwise direction as seen in Fig. 2 the nose 15 is brought into co-operating engagement with the cam surface 16 and the nose 13 is brought out of engagement with the cam surface 14, and thirdly during the anti-clockwise displacement of the handle 7 as seen in Fig. 1, the nose 15 is then displaced up the cam surface 16 until, as will be readily appreciated, the parts are in the positions relative one to another as shown in Figure 1. A chamfer is provided upon the cam surface 16 (as shown by dotted lines in Figs. 1, 5, 6 and 7) to facilitate the engagement of the nose 15 thereupon. It will be seen that stop surface 17 co-operates with the stop lug 18 to prevent the pawl 3 disengaging the rack bar 6 when the action of the spring 12 upon the ratchet lever yoke 4 by means of the nose 13 and the cam surface 14 is removed when the handle 7 is displaced in an anti-clockwise direction as seen in Fig. 2 thereby disengaging the nose 13 from the cam surface 14. Further pressure upon the handle 7 in an anti-clockwise direction as seen in Fig. 1 displaces the parts into the relative positions one to another as shown in Fig. 5 as hereinbefore described. Thus the pawl 3 is, by rotation of the ratchet lever yoke 4 about the pivot 5, caused to disengage the rack bar 6, thereby enabling the operating lever 1 to be displaced against torque exerted by the shaft 2 in a clockwise direction, until a desired position is reached, whereupon the pawl 3 is caused to re-engage the rack bar 6 as hereinbefore described.

A modified form of construction of the invention is described with reference to Figs. 8 to 11 as applied to a joiner's cramp consisting of a jaw 19 mounted on a bar 20 telescopically displaceable within a second jaw 21 to enable the securing therebetween of a workpiece such as 22. Mounted on the jaw 21 by means of a pivot 23 is a control handle 24, and pivoted about the same pivot 23 is an operating lever 25 to which is connected by pivot 26 a link 27, having in turn a pivotal connection with a latch 28 pivoted at 29 to the jaw 21 and having a ratchet tooth 30 engaging with one or other of the teeth of a rack bar 31 mounted on the bar 20.

Also pivotally mounted on the operating lever 25 by means of a pivot 32 is a pawl 33, the end of which is cranked around the control handle 24, as at 34, so that the operating handle 24 has a limited degree of motion relatively to the operating lever 25 engaging against the pivot 32 in one direction and against the cranked end 34 in the opposite direction.

This pawl 33 has cam surfaces 35, 36, adapted to cooperate with nose 38 on a pawl operating cam member 39 pivotally mounted at 37 on the control handle 24 and under the control of a spring 40, this pawl operating cam member 39 contacting on its upper surface with a cam 41 formed on the end of a cranked arm 42 on the operating lever 25, by which it will be seen that the handle 24 can be rocked freely about its pivot 23 (see particularly Fig. 9) to bring the nose 38 into contact either with the cam surface 35 or with the cam surface 36.

In operation the workpiece is placed adjacent the jaw 19 and the jaw 21 is brought into abutment with the other side of the workpiece. The control handle is raised upwardly as seen in Figures 8 and 11, that is to say, downwardly as seen in Figure 9, and is rotated in an anti-clockwise direction the leading edge of the control handle engaging the pivot 32 and thereby rotating the operating lever 25. The latch 28 is moved by the link 27 and the ratchet tooth 30 is forced to engage one or other of the teeth of the rack bar 31. When the control handle 24 is in its upper position as seen in Figures 8 and 11 the nose 38 abuts the cam surface 36. When the jaw 21 has been tightened sufficiently against the edge of the workpiece 22 the handle 24 is depressed as seen in Figures 8 and 11, that is it is raised as seen in Figure 9, and the nose 38 is moved out of engagement with the cam surface 36 whereupon the spring 40 causes the pawl operating cam member 39 to rotate about pivot 37 and bring nose 38 into contact with cam surface 35 and thereby urge pawl tooth 43 on pawl 33 to engage one or other of the teeth on the rack bar 44. The parts are then in the positions relative one to another as shown in Figure 8.

When it is required to release the jaw 21 the control handle 24 is rotated in a clockwise direction as seen in Figures 8 and 11 and is raised, that is it is depressed as seen in Figure 9. A cam surface 45 on pawl operating cam member 39 is brought into contact with cam 41 on cranked arm 42 and causes the pawl operating cam member 39 to be rotated relative to the control handle 24 in an anti-clockwise direction against the tension of spring 40. It will be seen that the nose 38 is thus brought into engagement with the cam surface 35 and, by raising the control handle 24 is caused to abut the cam surface 36, and consequently the toggle action retaining the pawl tooth 43 in contact with the rack bar 44 is discontinued and the operating lever 25 may be rotated in a clockwise direction so as to free the jaw 21. The parts are then disposed relatively one to another as shown in Figure 11.

I declare that what I claim is:

1. A control lever comprising in combination a pivoted operating lever, a pivoted control handle, a fixed ratchet rack, a pawl element on a yoke element which is pivoted to said operating lever to enshroud said control handle and which has two cam surfaces thereon one on each side of said yoke, said pawl element being lockable in engagement with said fixed ratchet rack, and a pawl operating cam member pivotally carried by said control handle and adapted to cooperate with either of said two cam surfaces on said yoke element in order respectively to lock or unlock said pawl element relatively to said ratchet rack, said control handle being capable of a limited degree of movement relatively to said operating lever in more than one plane and limited by said yoke element to enable said pawl operating cam member to be brought selectively into engagement with either of said cam surfaces.

2. A control lever comprising in combination a pivoted operating lever, a pivoted control handle, a fixed ratchet rack, a pawl element pivoted to said operating lever and having two cam surfaces thereon and which can be locked in engagement with said fixed ratchet rack, and a yoke shaped pawl operating cam member pivotally carried by said control handle and having two noses one on each side of said control handle each nose being adapted to co-operate with one or other of said two cam surfaces on said pawl element in order respectively to lock or unlock said pawl element relatively to said ratchet rack, said control handle being capable of a limited degree of movement relatively to said operating lever in more than one plane to enable each of said noses to be brought selectively into engagement with the corresponding cam surface.

3. A control lever comprising in combination a pivoted operating lever, a pivoted control handle, a fixed ratchet rack, a pawl element on a yoke element which is pivoted to said operating lever to enshroud said control handle and which has two cam surfaces thereon one on each side of said yoke, said pawl element being lockable in engagement with said fixed ratchet rack, a yoke shaped pawl operating cam member pivotally carried by said control handle and having two noses, one on each side of said control handle, each nose being adapted to co-operate with one or other of said two cam surfaces on said yoke element in order respectively to lock or unlock said pawl element relatively to said ratchet rack, and a resilient element intermediate said control handle and said pawl operating cam member to urge selectively one of said noses into contact with the corresponding one of said two cam surfaces, said control handle being capable of a limited degree of movement relatively to said operating lever in more than one plane and limited by said yoke element to enable selectively one of said noses to be brought into engagement with the corresponding cam surface.

4. A control lever comprising in combination a pivoted operating lever, a pivoted control handle, a fixed ratchet rack, a pawl element on a yoke element which is pivoted to said operating lever to enshroud said control handle, a first cam surface on said yoke on one side of said control handle, a second cam surface on said yoke on the opposite side of said control handle, said pawl element being lockable in engagement with said fixed ratchet rack, a yoke shaped pawl operating cam member pivotally carried by said control handle and having two noses, one on each side of said control handle, each nose being adapted to co-operate with one or other of said two cam surfaces on said yoke element in order respectively to lock or unlock said pawl element relatively to said ratchet rack, a resilient element intermediate said control handle and said pawl operating cam member to urge selectively one of said noses into contact with the corresponding one of said two cam surfaces, said control handle being capable of a limited degree of movement relatively to said operating lever in more than one plane and limited by said yoke element to enable selectively one of said noses to be brought into engagement with the corresponding cam surface, a chamfer on said second cam surface in the direction of approach of the corresponding nose, a depending stop surface on said control handle, and a stop lug projecting from said yoke element and cooperating with said stop surface to maintain said pawl element in engagement with said ratchet rack whilst the corresponding nose is disengaged from said first cam surface and the other of said noses is brought into engagement with said second cam surface.

5. A control lever comprising in combination a pivoted operating lever, a pivoted control lever, a fixed ratchet rack, a pawl element pivoted to one of said levers and having two cam surfaces thereon and which can be located in engagement with said fixed ratchet rack, a pawl operating cam member pivotally carried by the other of said levers and adapted to co-operate with either of said two cam surfaces on said pawl element in order respectively to lock or unlock said pawl element relative to said ratchet rack, said levers being capable of a limited degree of relative movement in more than one plane to enable said pawl operating cam member to be brought selectively into engagement with either of said cam surfaces.

6. A control lever comprising in combination a pivoted operating lever, a pivoted control lever, a fixed ratchet rack, a pawl element pivoted to one of said levers and a pawl operating cam element pivoted to the other of said levers, at least one of said elements having alternative surfaces adapted for engagement with the other of said elements to enable said pawl element to be locked or unlocked relatively to said ratchet rack and said levers being capable of a limited degree of relative movement in more than one plane to enable said elements to be selectively brought into engagement with one another appropriately for the locking or unlocking of said pawl element to or from said rack.

7. A control lever comprising in combination a pivoted operating lever, a pivoted control handle, a pivot on said operating lever, an upwardly inclined cranked arm on said operating lever, a transfer cam surface on said cranked arm, a fixed ratchet rack, a pawl element pivoted, through said pivot, to and in spaced parallel relationship with said operating lever and having side by side two cam surfaces thereon and which can be locked in engagement with said fixed ratchet rack, said pawl element having a cranked end portion extending in a direction substantially parallel to the axis of said pivot, a pawl operating cam member pivotally carried intermediate its ends by said control handle, a nose on said pawl operating cam member adapted to co-operate with either of said two cam surfaces on said pawl element in order respectively to lock or unlock said pawl element relatively to said ratchet rack, and a cam surface on said pawl operating cam member co-operating with said transfer cam surface, said control handle being capable of a limited degree of movement relatively to said operating lever in more than one plane limited by said pivot, by said pawl element, by said cranked end portion and by said operating lever to enable said nose on said pawl operating cam member to be brought selectively into engagement with either of said cam surfaces.

8. A control lever comprising in combination a pivoted operating lever, a pivoted control handle, a pivot on said operating lever, an upwardly inclined cranked arm on said operating lever, a transfer cam surface on said cranked arm a fixed ratchet rack, a pawl element pivoted, through said pivot, to and in spaced parallel relationship with said operating lever and having side by side two cam surfaces thereon and which can be locked in engagement with said fixed ratchet rack, said pawl element having a cranked end portion, an armed pawl operating cam member pivotally carried intermediate its ends by said control handle, a nose on one arm of said pawl operating cam member adapted to co-operate with either of said two cam surfaces on said pawl element in order respectively to lock or unlock said pawl element relatively to said ratchet rack, a cam surface on said pawl operating cam member co-operating with said transfer cam surface, and a resilient element intermediate the other arm of said pawl operating cam member and said operating lever, said control handle being capable of a limited degree of movement relatively to said operating lever in more than one plane to enable said nose on said pawl operating cam member to be brought selectively into engagement with either of said cam surfaces.

ERNEST GEORGE FRANCIS ROBERTSHAW.

REFERENCES CITED

The following references are of record in the file of this patent:

UNITED STATES PATENTS

| Number | Name | Date |
|---|---|---|
| 295,190 | Miles | Mar. 18, 1884 |
| 314,331 | Hamaker | Mar. 24, 1885 |
| 710,253 | Cooley | Sept. 30, 1902 |
| 1,012,371 | Kuehl | Dec. 19, 1911 |
| 1,182,707 | Quade | May 9, 1916 |
| 1,543,422 | Coultas | June 23, 1925 |
| 1,614,294 | Gans | Jan. 11, 1927 |
| 1,898,869 | Dadd | Feb. 21, 1933 |
| 1,983,192 | Saunders | Dec. 4, 1934 |
| 2,228,570 | Johnson | Jan. 14, 1941 |

FOREIGN PATENTS

| Number | Country | Date |
|---|---|---|
| 188,074 | Germany | Sept. 12, 1907 |